(12) United States Patent
Ito et al.

(10) Patent No.: US 8,490,940 B2
(45) Date of Patent: Jul. 23, 2013

(54) SEAT TRACK APPARATUS

(75) Inventors: Koji Ito, Kanagawa (JP); Hiroshi Koga, Kanagawa (JP)

(73) Assignee: Shiroki Corporation, Kanagawa (JP)

( * ) Notice: Subject to any disclaimer, the term of this patent is extended or adjusted under 35 U.S.C. 154(b) by 122 days.

(21) Appl. No.: 13/003,232

(22) PCT Filed: Jul. 6, 2009

(86) PCT No.: PCT/JP2009/062274
§ 371 (c)(1),
(2), (4) Date: Jan. 7, 2011

(87) PCT Pub. No.: WO2010/004949
PCT Pub. Date: Jan. 14, 2010

(65) Prior Publication Data
US 2011/0108697 A1 May 12, 2011

(30) Foreign Application Priority Data
Jul. 8, 2008 (JP) .................................. 2008-178449

(51) Int. Cl.
*F16M 13/00* (2006.01)
*A47C 1/00* (2006.01)

(52) U.S. Cl.
USPC .................. 248/429; 248/423; 297/344.1

(58) Field of Classification Search
USPC .......... 248/429, 430, 423; 297/344.1, 344.11, 297/341, 468, 344.13, 344.26, 473, 241, 297/246; 296/63, 65.01, 65.02, 68.1
See application file for complete search history.

(56) References Cited

U.S. PATENT DOCUMENTS

| | | | | |
|---|---|---|---|---|
| 5,028,028 A | * | 7/1991 | Yamada et al. | 248/430 |
| 5,167,393 A | * | 12/1992 | Hayakawa et al. | 248/430 |
| 5,524,504 A | | 6/1996 | Brandoli et al. | |
| 6,286,799 B1 | * | 9/2001 | Fujii | 248/430 |
| 6,322,036 B1 | * | 11/2001 | Tame et al. | 248/429 |
| 2008/0048476 A1 | * | 2/2008 | Kojima et al. | 297/341 |
| 2011/0108697 A1 | * | 5/2011 | Ito et al. | 248/429 |

FOREIGN PATENT DOCUMENTS
JP 07-195964 8/1995

OTHER PUBLICATIONS

English-language International Search Report from the Japanese Patent Office for International Application No. PCT/JP2006/062774 (Mail date Aug. 11, 2009).
The International Bureau of WIPO, International Preliminary Report on Patentability, Apr. 5, 2011, 8 pages, Switzerland.

* cited by examiner

*Primary Examiner* — Tan Le
(74) *Attorney, Agent, or Firm* — Finnegan, Henderson, Farabow, Garrett & Dunner, L.L.P.

(57) ABSTRACT

A seat track apparatus is provided including a first rail disposed on one of a floor side and a seat side, a second rail disposed on the other one of the floor side and the seat side and engaged with the first rail so as to be relatively movable, and a lock mechanism (71) configured to restrict the relative movement of the first rail and the second rail, the lock mechanism (71) includes a lock groove (73) formed on a lower rail (51) and a lock member (75) disposed on an upper rail (61), and the lock member (75) includes a rotation restricting portion (75c) which is brought into press-contact with the upper rail (61) from one side (upper side) to the other side (lower side) with respect to a straight line (L) passing through both end portions thereof.

6 Claims, 7 Drawing Sheets

SEAT TRACK APPARATUS

TECHNICAL FIELD

The present invention relates to a seat track apparatus including a first rail disposed on one of a floor side and a seat side, a second rail disposed on the other one of the floor side and the seat side and engaged with the first rail so as to be relatively movable, and a lock mechanism configured to restrict the relative movement of the first rail and the second rail.

BACKGROUND ART

Referring now to FIG. 10 and FIG. 11, a seat track apparatus in the related art will be described. FIG. 10 is a front view of a seat track in the related art, and FIG. 11 is a plan view of FIG. 10.

In these drawings, an upper rail 1 disposed on the seat side engages a lower rail 3 disposed on the floor side so as to be movable in the direction indicated by an arrow A.

Reference numeral 5 designates a lock mechanism which prohibits the movement of the upper rail 1. The lock mechanism 5 includes lock grooves 3a formed on the lower rail 3 and a lock member 7 disposed on the upper rail 1.

The lock grooves 3a of the lower rail 3 include a plurality of lock grooves formed along the direction of movement of the upper rail 1 (the direction indicated by the arrow A), and the depth direction thereof intersects the direction of movement of the upper rail 1 (the direction indicated by the arrow A).

The lock member 7 disposed on the upper rail 1 is formed by bending a wire rod having resiliency, is disposed on a side surface of the upper rail 1, and includes lock portions 7a at four positions so as to be engageable and disengageable with the lock grooves 3a of the lower rail 3. The lock member 7 is arranged along the direction of movement of the upper rail 1 and, in a natural state, is locked at both end portions thereof with the upper rail 1 so that the lock portions 7a engage the lock grooves 3a. The lock member 7 is formed with loop portions 7b for increasing an urging force in the direction to lock the lock portions 7a to be locked in the lock grooves 3a.

An operation of the configuration described above will be described. In the state shown in FIG. 10 and FIG. 11, the lock portions 7a of the lock member 7 disposed on the upper rail 1 engage the lock grooves 3a of the lower rail 3, so that the movement of the upper rail 1 is prohibited, and the lock mechanism 5 is brought into a locked state.

Here, when an intermediate portion of the lock member 7 is pushed downward in the direction indicated by an arrow B in FIG. 10, the lock portions 7a are disengaged from the lock grooves 3a of the lower rail 3, so that the movement of the upper rail 1 is enabled and the lock mechanism 5 is brought into an unlocked state (for example, see Patent Document 1).

Patent Document 1: JP-A-7-195964 (FIG. 21, FIG. 22)

DISCLOSURE OF INVENTION

Problems to be Solved by the Invention

In the seat track apparatus having a configuration as shown in FIG. 10 and FIG. 11, the lock member 7 is only supported at the both end portions thereof on the side surface of the upper rail 1, and hence is rotatable about a straight line passing through the both end portions as the center axis of rotation. In other words, there exists a backlash between the lock member 7 and the side surface of the upper rail 1.

Therefore, there is a problem of generation of abnormal sounds caused by the lock member 7 hitting against the side surface of the upper rail 1 due to vibrations of a vehicle.

There is also a problem of unsmooth movement of the lock member 7 in the direction indicated by the arrow B when locking and unlocking.

In view of such problems, it is an object of the present invention to provide a seat track apparatus which does not cause abnormal sounds and achieves smooth locking and unlocking.

Means for Solving the Problems

According to one aspect of the invention, a seat track apparatus is provided including: a first rail provided on one of a floor side and a seat side; a second rail provided on the other one of the floor side and the seat side and engaging the first rail so as to be movable relative to each other; and a lock mechanism configured to prohibit the relative movement of the first rail and the second rail; characterized in that the lock mechanism includes: a plurality of lock grooves formed on the first rail along the direction of relative movement so as to have a depth in the direction intersecting the direction of the relative movement; and a resilient lock member having a lock portion which is engageable and disengageable with the lock groove, arranged on the second rail along the direction of relative movement, and locked at both end portions thereof with the second rail so that the lock portion engages the lock groove in a natural state, and the lock member further includes: a first press-contact portion formed on one side with respect to a straight line passing through the both end portions and configured to come into press-contact with the second rail to prohibit the rotation of the lock member in one direction about the straight line passing through the both end portions as the center axis of rotation, and a second press-contact portion formed on the other side and configured to come into press-contact with the second rail to prohibit the rotation of the lock member in the other direction about the straight line passing through the both end portions as the center axis of rotation.

Normally, the lock portions of the lock member disposed on the second rail engage the lock grooves formed on the first rail, so that a locked state which prohibits the relative movement of the first rail with respect to the second rail is assumed.

Here, by resiliently deforming the lock member and disengaging the lock portion from the lock groove, an unlocked state which allows the relative movement between the first rail and the second rail is assumed.

When the operating force which causes the lock members to be resiliently deformed is released, the lock member is resiliently restored, the lock portions engage the lock grooves, and the relative movement between the first rail and the second rail is prohibited again, so that the locked state is assumed.

The seat track apparatus may be characterized in that the lock member is provided with an unlocking load input portion which receives an input of a load in the unlocking direction, and the lock portion, one of the first press-contact portion and the second press-contact portion of the lock member, and the unlocking load input portion are formed continuously.

The seat track apparatus may be also characterized in that the lock member is provided with an unlocking load input portion which receives an input of a load in the unlocking direction, a plurality of the lock portions are provided, and the unlocking load input portion is provided at a midpoint between the plurality of lock portions.

The seat track apparatus may be also characterized in that the lock member is formed by bending a wire rod.

Effects Of The Invention

According to one preferred embodiment the lock member further includes: a first press-contact portion formed on one side with respect to a straight line passing through the both end portions and configured to come into press-contact with the second rail to prohibit the rotation of the lock member in one direction about the straight line passing through the both end portions as the center axis of rotation, and a second press-contact portion formed on the other side and configured to come into press-contact with the second rail to prohibit the rotation of the lock member in the other direction about the straight line passing through the both end portions as the center axis of rotation, so that the lock member cannot be rotated about the straight line passing through the both end portions as the center axis of rotation. In other words, there is no backlash between the lock member and a surface where the lock member of the second rail is provided.

Therefore, the lock member is prevented from hitting against the upper rail and generating abnormal sounds due to vibrations of a vehicle. The lock member moves smoothly when locking and unlocking.

According to one preferred embodiment, the lock member is provided with an unlocking load input portion which receives an input of a load in the unlocking direction, and the lock portion, one of the first press-contact portion and the second press-contact portion of the lock member, and the unlocking load input portion are formed continuously, so that the unlocking load input portion is positioned near the lock portion. Therefore, the time lag from when the load in the unlocking direction is input to the unlocking load input portion until when the lock portion starts to move is shortened. Also, a transmission loss of the load in the course of transmission of the unlocking load from the unlocking load input portion to the lock portion is reduced.

According to another preferred embodiment, the lock member is provided with an unlocking load input portion which receives an input of a load in the unlocking direction, a plurality of the lock portions are provided, and the unlocking load input portion is provided at a midpoint between the plurality of lock portions. Therefore, when the unlocking load is input to the unlocking load input portion, the respective lock portions are engaged and disengaged with respect to the lock grooves at the same timing.

According to one embodiment, since the lock member is formed by bending a wire rod, it is easy to work and is small in cost.

BEST MODES FOR CARRYING OUT THE INVENTION

Referring firstly to FIG. 7, a general configuration of a seat track apparatus will be described. FIG. 7 is a perspective view showing a general configuration of the seat track in an embodiment.

A lower rail 51 as a first rail is disposed on a floor side. An upper rail 61 as a second rail is disposed on a bottom surface of a seat cushion of a seat, and the upper rail 61 engages the lower rail 51 so as to be movable in the direction indicted by an arrow D.

Reference numeral 71 designates a lock mechanism which prohibits the movement of the upper rail 61 with respect to the lower rail 51.

In general, a pair of seat track apparatuses arranged in parallel to each other are provided on the seat. However, only one of the seat track apparatuses is shown in FIG. 7 and the other seat track apparatus is omitted.

Referring next to FIG. 8, a cross-sectional shape of the lower rail 51 and the upper rail 61 will be described. FIG. 8 is a cross-sectional view taken along a cutting line C-C in FIG. 7.

The lower rail 51 will be described first. The cross section of the lower rail 51 includes portions (1) to (7) shown below.
(1) a base portion 51a on the side of a floor F,
(2) a first side portion 51b bent from one end portion of the base portion 51a at an angle of substantially 90 degrees and extending upward,
(3) a first top portion 51c bent from an upper end of the first side portion 51b so as to be substantially parallel to the floor F and opposed to the base portion 51a and having a length shorter than the base portion 51a in the horizontal direction,
(4) a first suspending portion 51d bent from a distal end portion of the first top portion 51c at an angle of substantially 90 degrees, extending toward the base portion 51a, and having a length shorter than the first side portion 51b in the height direction,
(5) a second side portion 51e bent to extend away from the base portion 51a obliquely upward from the other end portion of the base portion 51a and having a height smaller than the first side portion 51b,
(6) a second top portion 51f bent from an upper end of the second side portion 51e at an angle of substantially 90 degrees and extending toward the first top portion 51c,
(7) a second suspending portion 51g bent from a distal end portion of the second top portion 51f at an angle of substantially 90 degrees, extending toward the base portion 51a, and having a length shorter than the second side portion 51e in the height direction, and
a space S is formed between the first suspending portion 51d and the second suspending portion 51g.

In addition, the first suspending portion 51d of the lower rail 51 is formed with a plurality of lock grooves 73 along the direction of movement (the direction indicated by the arrow D) of the upper rail 1 equidistantly as shown in FIG. 7. The direction of depth of the lock grooves 73 is the direction intersecting the direction of movement of the upper rail 1 (the direction indicated by the arrow D).

Subsequently, the upper rail 61 will be described. The upper rail 61 includes two plate members, and the cross section of the upper rail 61 is made up of portions (1) to (7) shown below.
(1) a base 61a including two laminated plate members and fitted into the space S of the lower rail 51,
(2) a first bottom portion 61b bent from a lower portion of one of the two plate members at an angle of substantially 90 degrees, extending toward the first side portion 51b of the lower rail 51 and opposing the base portion 51a of the lower rail 51 with the intermediary of the space,
(3) a first side portion 61c bent from a distal end portion of the first bottom portion 61b at an angle of substantially 90 degrees and extending toward the first top portion 51c of the lower rail 51,
(4) a first ball holding portion 61d formed at a distal end of the first side portion 61c and extending toward the first side portion 51b of the lower rail 51,
(5) a second ball holding portion 61e formed at a distal end of the first ball holding portion 61d and extending toward a corner between the first top portion 51c and the first suspending portion 51d in a space surrounded by the first side portion 51b, the first top portion 51c, and the first suspending portion 51d of the lower rail 51, (6) a second bottom portion 61f bent from a lower portion of the other one of the two plate members at an angle of substantially 90 degrees, extending toward the second side portion 51e of the lower rail 51, and opposing the base portion 51a of the lower rail 51 with the intermediary of the space, (7) a second side portion 61g bent obliquely upward from a distal end portion of the second bottom portion 61f and extending toward a space surrounded by the second side portion 51e, the second top portion 51f, and the second suspending portion 51g of the lower rail 51, and the upper rail 61 is configured to be movable with respect to the lower rail 51 by a roller 41 disposed on the base portion 51a of the lower rail 51 and allowing the first bottom portion 61b of the upper rail 61 to come into abutment therewith, a ball 43 which comes into abutment with the first side portion 51b, the first top portion 51c of the lower rail 51, and the second ball holding portion 61e of the upper rail 61, and a ball 45 which comes into abutment with the first suspending portion 51d of the lower rail 51, the first ball holding portion 61d, and the second ball holding portion 61e of the upper rail 61.

Referring now to FIG. 1 to FIG. 6, a lock mechanism will be described. FIG. 1 is a perspective view for explaining the lock mechanism of a seat track apparatus according to this embodiment, FIG. 2 is a drawing viewed in the direction indicated by an arrow E in FIG. 1, FIG. 3 is a perspective view before assembling the lock member in FIG. 1, FIG. 4 is a drawing viewed in the direction indicated by an arrow F in FIG. 3, FIG. 5 is a drawing viewed in the direction indicated by an arrow G in FIG. 3, and FIG. 6 is a drawing viewed in the direction indicated by an arrow H in FIG. 3.

As shown in FIG. 2, a lock member 75 formed by bending a wire rod having resiliency is disposed on the base 61a formed by laminating two plate members of the upper rail 61 on the side of the second side portion 51e of the lower rail 51. The lock member 75 has a lateral symmetrical shape as shown in FIG. 3 to FIG. 6, and includes portions (1)-(10) shown below from both end portions toward a center portion. The direction indicated by the arrow G is defined as the forward direction and the direction indicated by the arrow F is defined as the downward direction.

(1) linear supporting portions 75a,
(2) upward extending portions 75b extending obliquely from distal ends of the supporting portions 75a upward and rearward,
(3) rotation restricting portions 75c bent from distal end portions of the upward extending portions 75b downward at an angle of substantially 90 degrees and extending to the lower sides of the supporting portions 75a,
(4) center extending portions 75d bent from distal end portions of the rotation restricting portions 75c at an angle of substantially 90 degrees and extending toward a center portion,
(5) lock portions 75e bent from distal end portions of the center extending portions 75d at an angle of substantially 90 degrees and extending rearward,
(6) lock portion connecting portions 75f bent from distal end portions of the lock portions 75e at an angle of substantially 90 degrees and extending toward the center portion,
(7) lock portions 75g bent from distal end portions of the lock portion connecting portions 75f at an angle of substantially 90 degrees and extending forward,
(8) upward extending portions 75h bent from distal end portions of the lock portions 75g at an angle of substantially 90 degrees and extending upward,
(9) forward extending portions 75i bent from distal end portions of the upward extending portions 75h at an angle of substantially 90 degrees and extending forward, and
(10) a bridging portion 75j bridging the forward extending portions 75i on one side and the forward extending portions 75i on the other side at a center portion.

As shown in FIG. 1, the base 61a of the upper rail 61 is formed with two cut-and-raised portions 61h for supporting the supporting portion 75a of the lock member 75.

As shown in FIG. 1 and FIG. 2, holes 61i are formed between the two cut-and-raised portions 61h of the upper rail 61 where projecting portions including the lock portions 75e, the lock portion connecting portions 75f, and the lock portions 75g of the lock member 75 are passed through. More specifically, the base 61a includes two plate members laminated one on top of another, and large rectangular holes are formed through the plate member on the side where the lock member 75 is directly disposed, and small rectangular holes are formed through the other plate member, and the small holes are each formed with a tongue portion 61j which extends into a space surrounded by the lock portion 75e, the lock portion connecting portion 75f, and the lock portion 75g.

Furthermore, the lock member 75 in a natural state is attached to the upper rail 61 so that the lock portions 75e and the lock portions 75g engage the lock grooves 73 of the lower rail 51.

A shown in FIG. 1, FIG. 2, FIG. 7, and FIG. 8, an unlocking lever 77 is mounted to the upper rail 61 along the upper rail 61 using a pin 79. The unlocking lever 77 is formed on the side of one of the rotating end portions thereof with a bent portion 77b (see FIG. 8) bent toward the upper rail 61. Formed underside of the bent portion 77b is a groove 77a for allowing insertion of the bridging portion 75j of the lock member 75. A bottom portion of the groove 77a and the bridging portion 75j of the lock member 75 are allowed to come into abutment with each other.

A handle 81 connected to an unlocking lever of the other seat track apparatus is connected to the unlocking lever 77 on the side of the other rotating end portion.

Therefore, when the handle 81 is moved upward in FIG. 1 and FIG. 2, the side of one of the rotating end portions of the unlocking lever 77 is moved downward to press the bridging portion 75j of the lock member 75 from above, so that the lock portions 75e and the lock portions 75g are disengaged from the lock grooves 73 of the lower rail 51.

Furthermore, in this embodiment, the unlocking lever 77 is lightly urged in the direction in which the bottom portion of the groove 77a of the bent portion 77b pushes the bridging portion 75j of the lock member 75 by a spring 83 wound around the pin 79 at an intermediate portion thereof, and locked at one end portion thereof in the upper rail 61 and the other end portion thereof to the unlocking lever 77.

Then, in this embodiment, the upward extending portions 75b of the lock member 75 extend obliquely upward and rearward, that is, toward the base 61a of the upper rail 61 as shown in FIG. 4 and FIG. 6. Therefore, the rotation restricting portions 75c of the lock member 75 are in press-contact with the base 61a of the upper rail 61.

Subsequently, an operation of the configuration described above will now be described.

Normally, the lock portions 75e and the lock portions 75g of the lock member 75 disposed on the upper rail 61 engage the lock grooves 73 formed on the lower rail 51, so that a locked state which prohibits the movement of the upper rail 61 with respect to the lower rail 51 is assumed.

Here, when the handle 81 is moved upward, one of the rotating end portions of the unlocking lever 77 is moved downward to press the bridging portion 75*j* of the lock member 75 from above, resiliently deform the lock member 75, and disengage the lock portions 75*e* and the lock portions 75*g* from the lock grooves 73 of the lower rail 51, so that an unlocked state which allows the movement of the upper rail 61 with respect to the lower rail 51 is assumed.

Therefore, the bridging portion 75*j* of the lock member 75 serves as an unlocking load input portion which receives an input of an unlocking load.

When the operating force of the handle 81 is released, the lock member 75 is resiliently restored, and the lock portions 75*e* and the lock portions 75*g* engage the lock grooves 73, so that the movement of the upper rail 61 with respect to the lower rail 51 is prohibited again and hence the locked state is assumed.

In the configuration as described above, the following effects can be obtained in this embodiment.

(1) As shown in FIG. 8, the rotation restricting portions 75*c* of the lock member 75 are in press-contact with the base 61*a* of the upper rail 61 continuously from one end side (upper portion) to the other end side (lower portion) with respect to the straight line (a straight line L in FIG. 3 and FIG. 4) passing through the supporting portions 75*a* of the lock member 75 at both ends.

Therefore, the lock member 75 is prohibited from rotating in one direction and the other direction about the straight line passing through the both end portions (supporting portions 75*a*) as the center axis of rotation. In other words, there is no backlash between the lock member 75 and the base 61*a* as a surface where the lock member of the upper rail 61 is provided.

In addition, in this embodiment, the center extending portions 75*d* and the upward extending portions 75*h* of the lock member 75 are in press-contact with the base 61*a* of the upper rail 61 on the other side (lower portion) with respect to the straight line (the straight line L in FIG. 3 and FIG. 4) passing though the supporting portions 75*a* at the both ends of the lock member 75 to prohibit the rotation of the lock member 75 in one direction about the straight line passing through the supporting portions 75*a* as the center axis of rotation at the both ends of the lock member 75.

Therefore, the lock member 75 is prevented from hitting against the upper rail and generating abnormal sounds due to vibrations of the vehicle. The lock member 75 moves smoothly when locking and unlocking.

(2) Since the bridging portion (unlocking load input portion) 75*j* which receives an input of the load in the unlocking direction, the upward extending portions 75*h* as press-contact portions, and the lock portions 75*g* are formed continuously, the bridging portion 75*j* as the unlocking load input portion stands near the lock portions 75*g*. Therefore, a time lag from the input of the load in the unlocking direction to the bridging portion 75*j* as the unlocking load input portion until the lock portions 75*g* start to move is shortened. In addition, a transmission loss of the load in the course of transmission of the unlocking load from the bridging portion 75*j* as the unlocking load input portion to the lock portions 75*g* is reduced.

(3) The lock member 75 is provided with the bridging portion 75*j* as the unlocking load input portion which receives an input of the load in the unlocking direction and a plurality of the lock portions 75*g* are provided, and the bridging portion 75*j* as the unlocking load input portion is provided at a midpoint of the plurality of lock portions 75*g*, so that when the unlocking load is input to the bridging portion 75*j* as the unlocking load input portion, the respective lock portions 75*g* engage and disengage the lock grooves 73 at the same timings.

(4) Since the lock member 75 is formed by bending the wire rod, it is easy to work and is small in cost.

The present invention is not limited to the above-described embodiment. In the above-described embodiment, the lock member 75 is provided with the rotation restricting portions 75*c* which comes into press-contact with the base 61*a* of the upper rail 61 continuously from one end side (upper portion) to the other end side (lower portion) with respect to the straight line (the straight line L in FIG. 3 and FIG. 4) passing through the supporting portions 75*a* of the lock member 75 at the both ends. However, the rotation of the lock member 75 can be prohibited only with the provision of two points, that is, one point (first press-contact portion) which comes into press-contact with the upper rail 61 on one side with respect to the straight line (L) passing through the both end portions of the lock member 75 to prohibit the rotation in one direction about the straight line passing through the both end portions (supporting portions 75*a*) as the center axis of rotation, and one point (second press-contact portion) which comes into press-contact with the upper rail 61 on the other side and prohibits the rotation in the other direction about the straight line passing through the both end portions (supporting portions 75*a*) as the center axis of rotation.

Although the lock grooves 73 are formed on the lower rail 51 and the lock member 75 is provided on the upper rail 61, it is also possible to form the lock grooves on the upper rail and provide the lock member on the lower rail.

In addition, the lock member 75 in the embodiment described above includes the two projecting portions made up of the lock portions 75*e*, the lock portion connecting portions 75*f*, and the lock portions 75*g* and inserted into the holes 61*i* of the upper rail 61 as shown in FIG. 3-FIG. 6. However, even when there is only one projecting portion, if the required locking strength is obtained, a lock member 75' having a shape as shown in FIG. 9 may be employed. In FIG. 9, the same portions as those in FIG. 3-FIG. 6 are attached with (') on the reference numerals, and description will be omitted. As shown in the drawing, on one side (left side) of the lock member 75' is formed with a projecting portion made up of a lock portion 75*e*', a lock portion connecting portion 75*f*', and a lock portion 75*g*'. In contrast, on the other side (right side) of the lock member 75' does not have a projecting portion and a rotation restricting portion 75*c*' and an upward extending portion 75*h*' are connected by a bridging portion 75*k*.

Reference Numerals

Figure 1:
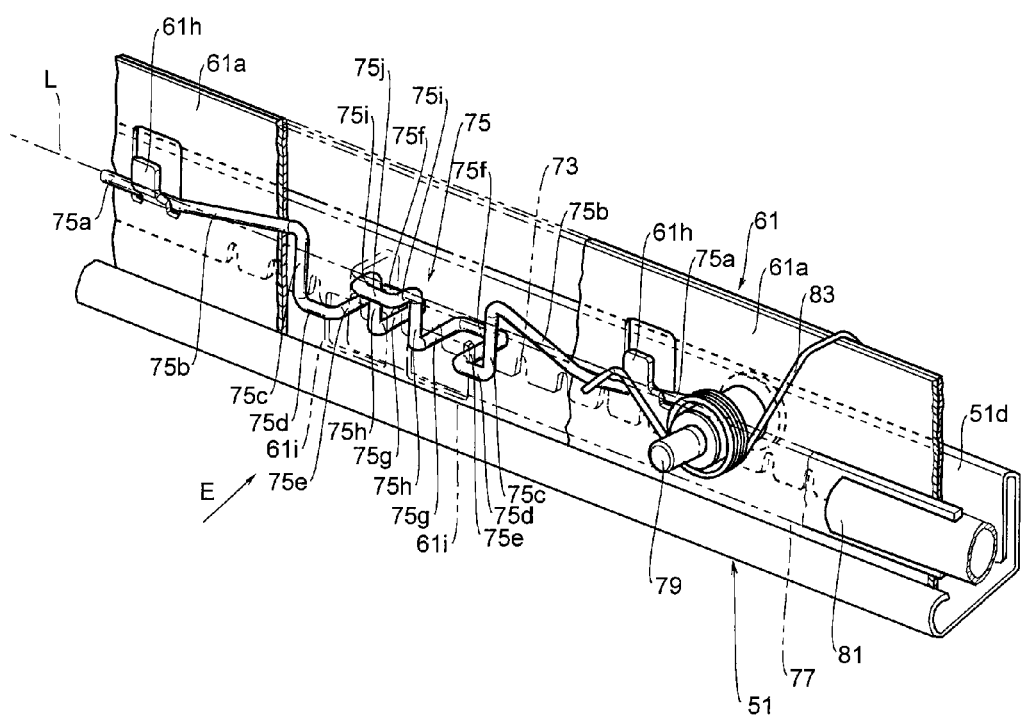
FIG. 1 is a perspective view for explaining a lock mechanism of a seat track apparatus of this embodiment.
Figure 2:
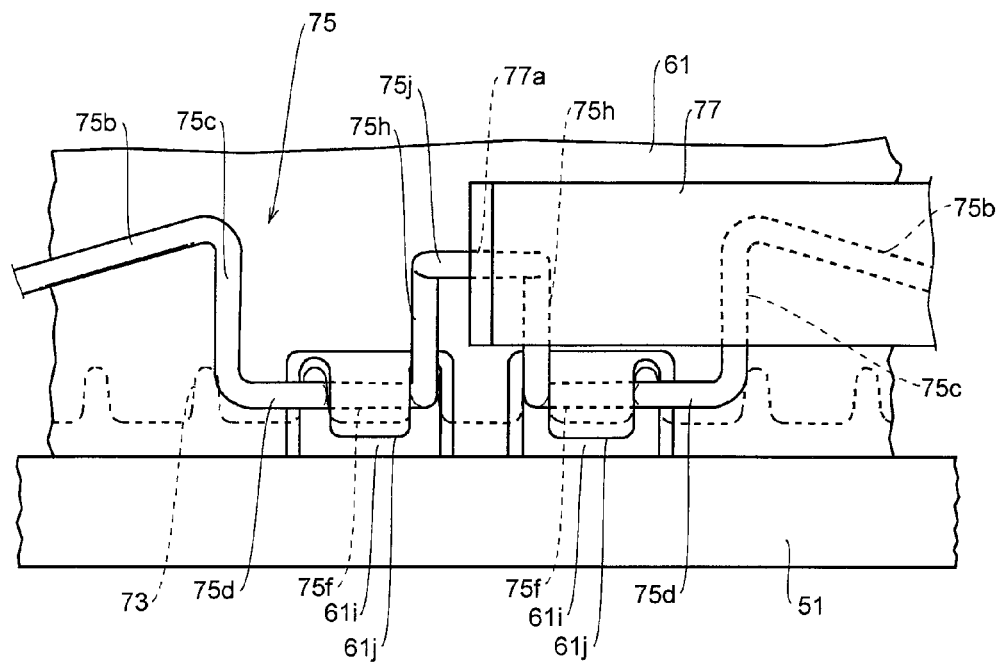
FIG. 2 is a drawing viewed in the direction indicated by an arrow E in FIG. 1.
Figure 3:
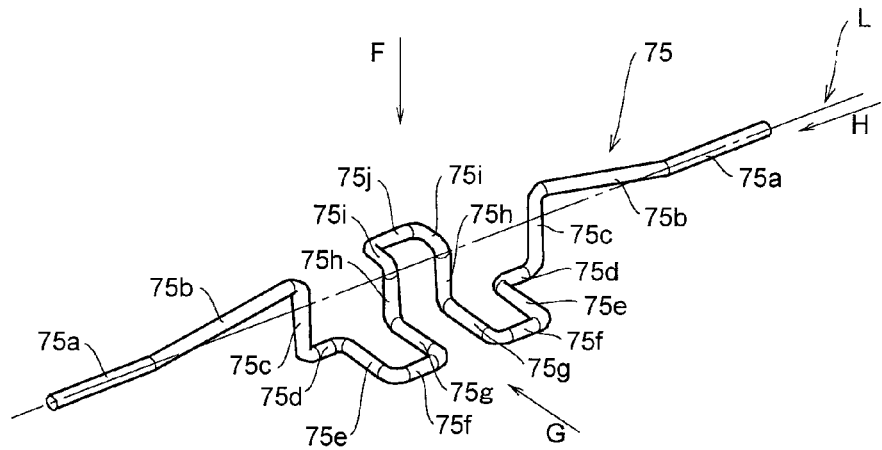
FIG. 3 is a perspective view showing a state before assembling a lock member in FIG. 1.
Figure 4:
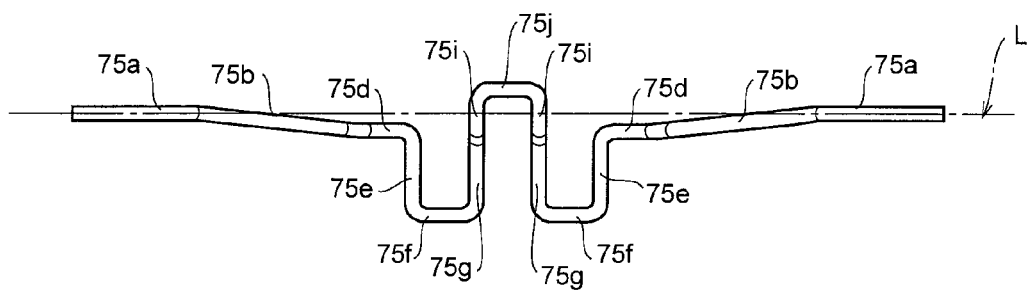
FIG. 4 is a perspective view from the direction indicated by an arrow F in FIG. 3.
Figure 5:
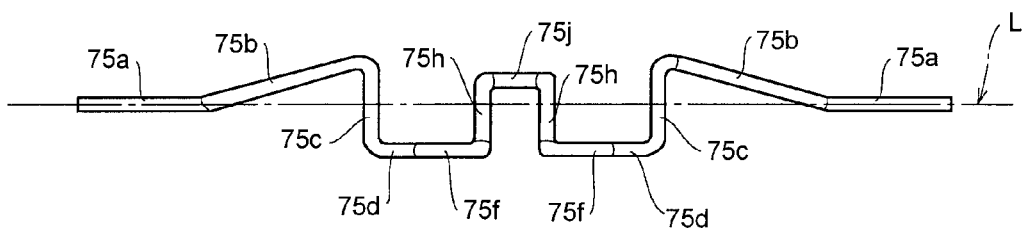
FIG. 5 is a perspective view from the direction indicated by an arrow G in FIG. 3.
Figure 6:
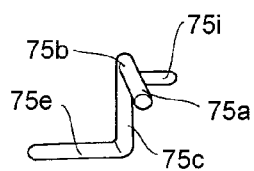
FIG. 6 is a perspective view from the direction indicated by an arrow H in FIG. 3.
Figure 7:
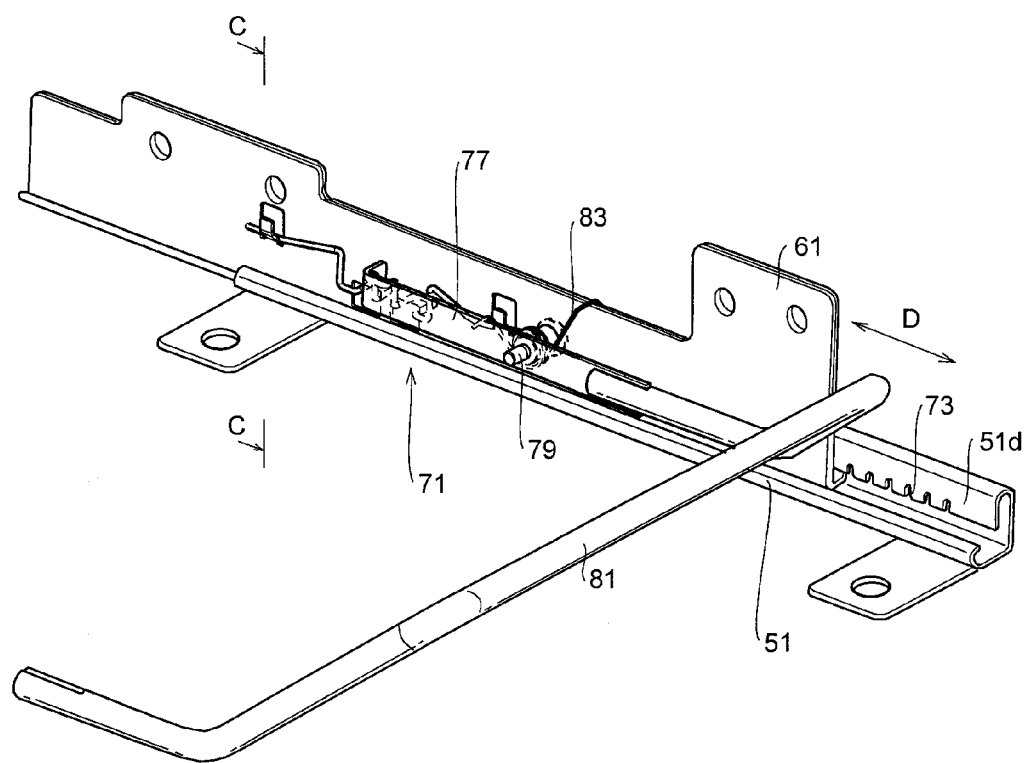
FIG. 7 is a perspective view showing a general configuration of a seat track in the embodiment.
Figure 8:
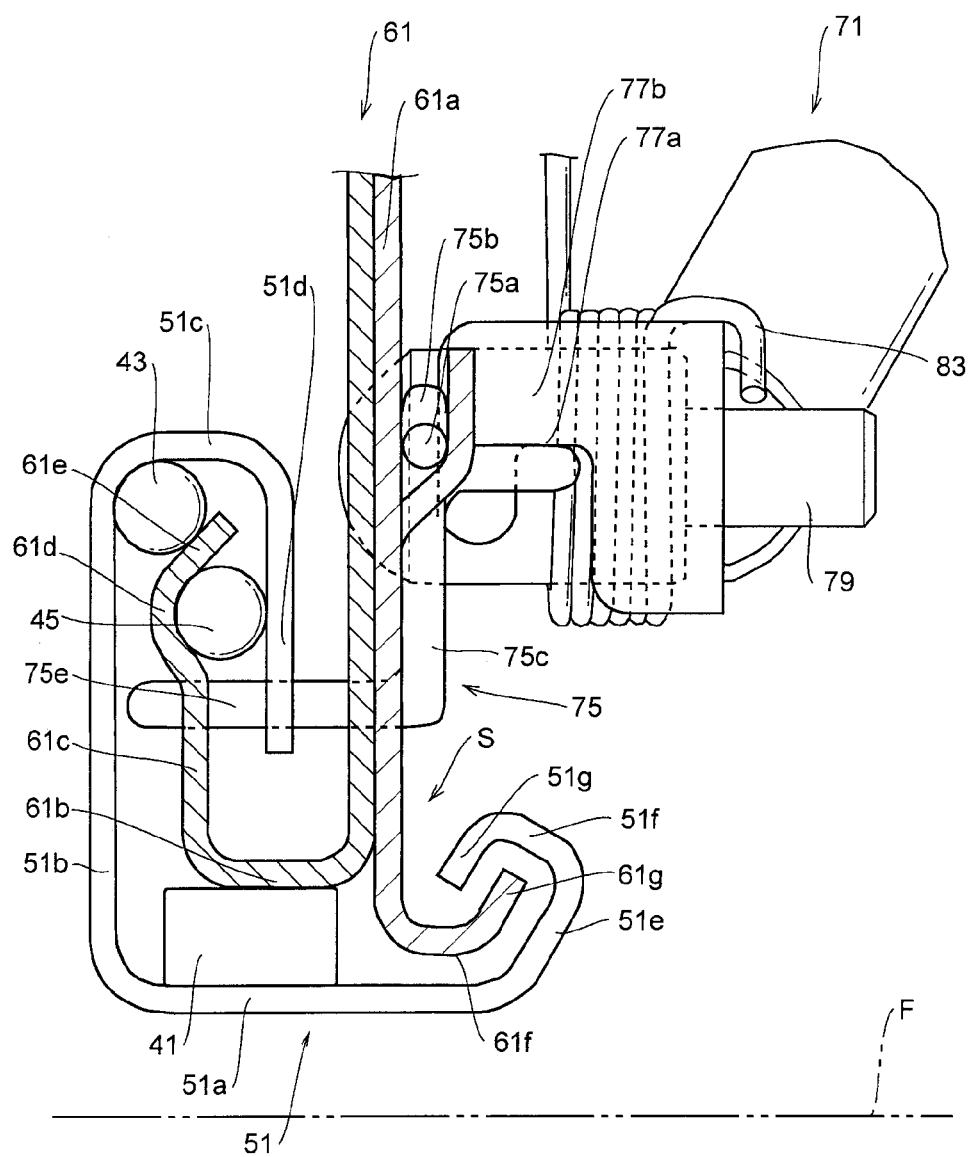
FIG. 8 is a cross-sectional view taken along the line C-C in FIG. 7.
Figure 9:
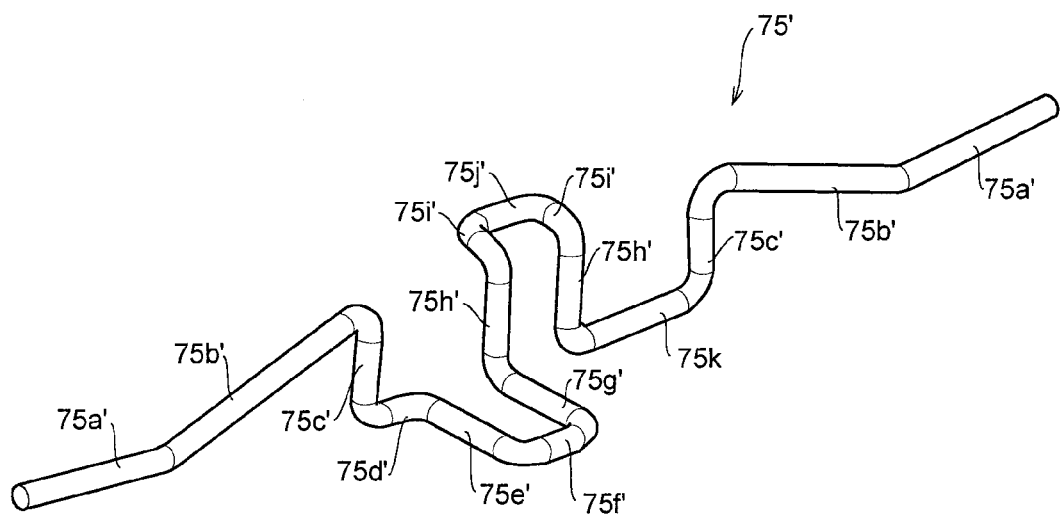
FIG. 9 is an explanatory drawing showing another embodiment.
Figure 10:
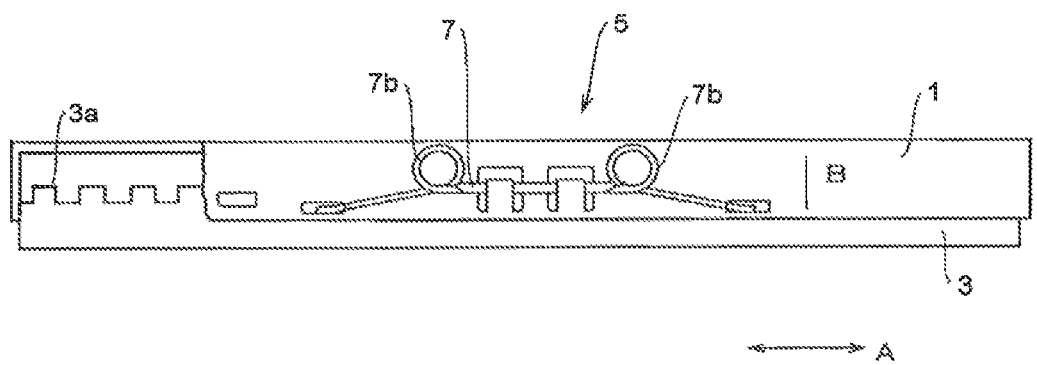
FIG. 10 is a front view of a seat track in the related art.
Figure 11:
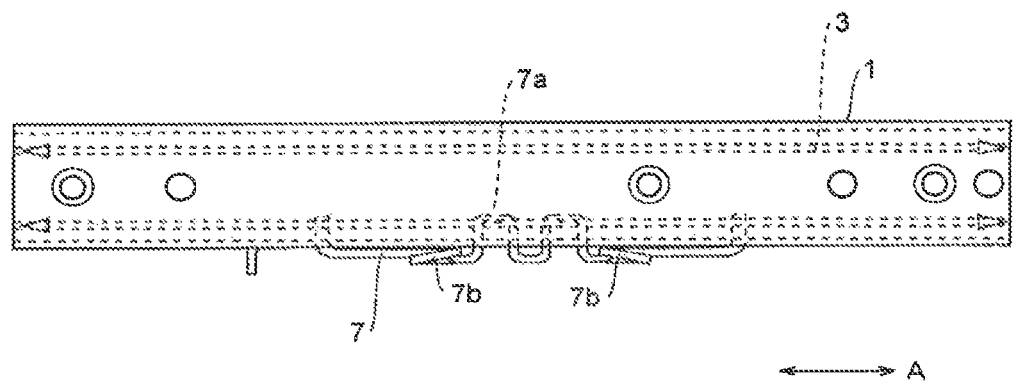
FIG. 11 is a plan view of FIG. 10.

51 lower rail
61 upper rail
73 lock groove
75 lock member
75*c* rotation restricting portion

The invention claimed is:

1. A seat track apparatus comprising:
a first rail provided on one of a floor side and a seat side;
a second rail provided on the other one of the floor side and the seat side and engaging the first rail so as to be movable relative to each other; and
a lock mechanism configured to prohibit the relative movement of the first rail and the second rail, including an unlocking lever that moveable to permit relative movement of the first rail and the second rail:
characterized in that the lock mechanism includes:
a plurality of lock grooves formed on the first rail along the direction of relative movement so as to have a depth in the direction intersecting the direction of the relative movement; and
a resilient lock member having a lock portion which is engageable and disengageable with the lock grooves, arranged on the second rail along the direction of relative movement, and locked at both end portions thereof with the second rail so that the lock portion engages the lock grooves in a natural state, and
the lock member further includes:
a first press-contact portion formed on one side of a straight line passing through the both end portions in press-contact with the second rail to prohibit the rotation of the lock member in one direction about the straight line passing through the both end portions as the center axis of rotation,
a second press-contact portion formed on the other side of the straight line in press-contact with the second rail to prohibit the rotation of the lock member in the other direction about the straight line passing through the both end portions as the center axis of rotation.

2. The seat track apparatus according to claim 1, characterized in that the lock member is provided with an unlocking load input portion which receives an input of a load in the unlocking direction from the unlocking lever, and the lock portion, one of the first press-contact portion and the second press-contact portion of the lock member, and the unlocking load input portion are formed continuously.

3. The seat track apparatus according to claim 1, characterized in that the lock member is provided with an unlocking load input portion which receives an input of a load in the unlocking direction from the unlocking lever,
a plurality of the lock portions are provided, and
the unlocking load input portion is provided at a midpoint between the plurality of lock portions.

4. The seat track apparatus according to any one of claims 1 to 3, characterized in that the lock member is formed by bending a wire rod.

5. The seat track apparatus according to claim 2, wherein the first press-contact portion and the second press-contact portion are formed continuously.

6. The seat track apparatus according to claim 5, further including
a third press-contact portion formed in press-contact with the second rail and between the unlocking load input portion and the lock portion.

\* \* \* \* \*